United States Patent Office 3,462,325
Patented Aug. 19, 1969

3,462,325
FLARE COMPOSITION COMPRISING MAGNE-
SIUM, SODIUM PERCHLORATE, AND A TER-
NARY ORGANIC BINDER
Yoshiyuki Arikawa, Destin, and Hal R. Waite, Walton
Beach, Fla., assignors, by mesne assignments, to the
United States of America as represented by the Secre-
tary of the Navy
No Drawing. Filed Oct. 24, 1968, Ser. No. 770,380
Int. Cl. C06d 1/10; C06b 11/00
U.S. Cl. 149—19                3 Claims

ABSTRACT OF THE DISCLOSURE

A castable illuminating flare composition producing high luminous efficiencies comprised, by weight, of between 40 and 48 percent of magnesium, between 40 and 44 percent of sodium perchlorate, and between 12 and 16 percent of a binder which is a mixture of a methacrylate monomer and a polyester resin.

BACKGROUND OF THE INVENTION

Pyrotechnic devices that are designed for military applications generally are comprised of a metal fuel, an oxidizer, and a binder. One method of manufacturing such pyrotechnic devices consisted of mixing the ingredients and then subjecting the mixture to a very high pressure. The resulting product has a density depending upon various conditions, such as the type of ingredients in the mixture, and the amount and duration of the pressure applied. Different densities result in wide variations in the rates of combustion of the pyrotechnic devices, which results in unpredictable functioning of the product.

In order to overcome the disadvantages of compacted pyrotechnic articles, recent developments in the pyrotechnic art has produced various plastic type compounds that can be cast or molded. One such plastic compound is described in U.S. Patent 2,984,558, which issued May 16, 1961, to Edward Rolle and John Q. Tabor. This patented compound is essentially a mixture of unsaturated polyester resins to which is added a stabilizing ingredient, oxidizers, and a fuel.

Another pyrotechnic composition designed for pour casting is described in U.S. Patent 3,258,373, entitled, "Plastic Pyrotechnic Compositions Containing Strontium Perchlorate and Acrylic Polymer," which issued June 28, 1966, to Bernard E. Douda. In this patented composition, strontium perchlorate is added to an acrylic monomer with a portion of the strontium perchlorate being dissolved in the acrylic monomer and with the undissolved strontium perchlorate remaining suspended in solid form until complete polymerization takes place.

Although a number of commercial polyester resin formulations are available and appear to have utility as a binder, they are generally formulated to contain styrene (vinyl benzene) monomer which contains no oxygen and have a high carbon content. One of the desirable characteristics of a binder would be to contain a high percentage of oxygen or other oxidizing elements to enhance combustion of the flare grain. Another desirable characteristic for a binder is having a minimum of carbon molecules thereby reducing formation of elemented carbon in the flare plume during combustion.

SUMMARY OF THE INVENTION

The present invention provides an improved casting composition for use as an illuminating composition having high luminous efficiency. A metal fuel, such as magnesium, and an oxidizer, such as sodium perchlorate are mixed with a monomer and an unsaturated polyester resin and then cast and polymerized. Castable visual flare formulations producing luminous efficiencies up to 51,000 candle-seconds/gram and having a high binder percentage have been developed. The use of liquid polyester resins greatly facilitate the fabrication of the flares. Optimum results were obtained when the oxidizer to fuel ratio was maintained near the 1 to 1 range.

It is therefore a general object of the present invention to provide an improved flare composition which can be cast and which will provide high luminous efficiency.

Other objects and advantages of the present invention will be readily appreciated as the same becomes better understood by reference to the following detailed description.

DESCRIPTION OF THE PREFERRED EMBODIMENT

The present invention resulted from a program to develop a binder system not containing styrene monomer. The oxidizer sodium perchlorate was selected largely because of its solubility in certain organic solvents. Sodium nitrate, which is used extensively in standard pressed grains, is practically insoluble in solvents other than water and offers little utility in formulating grains which contain a high percentage of oxygen. It appeared advantageous to dissolve the oxidizer salt to allow higher solids loading and more uniform oxidizer-fuel distribution.

The basic monomer used in the present invention is glycidyl methacrylate which can be predictably polymerized and which contains 33.8 percent oxygen in its basic molecule. Also sodium perchlorate is somewhat soluble in glycidyl methacrylate. Suitable basic polyester resins are added to improve polymerization characteristics and also to improve particle wetting of the solids to facilitate casting. Two liquid basic polyester resins which showed compatibility with glycidyl methacrylate monomer were obtained from the Commercial Resins Division of Interplastic Corporation, Minneapolis, Minn., under the trade names "CoRezyn 3" and "CoRezyn 10." "CoRezyn 3" is a viscous liquid resin (viscosity, over 100,000 cps.) which, when diluted with monomer gives a very flexible resin. "CoRezyn 3" is a straw-colored liquid having a specific gravity of 1.23. "CoRezyn 10" is a monomer free unsaturated polyester resin having a light straw color and a relatively low viscosity of between 600 and 650 cps.

Various formulations were tried using either "CoRezyn 3" or "CoRezyn 10." As a starting point, slurries were made using 4 percent of basic polyester resin and 12 percent of monomer, with the balance being oxidizer and fuel. To improve particle wetting, the percentages of liquid polyester resins were raised from 4 percent to 7.75 percent of the total composition, with a resultant increase in viscosity. The formulation containing 7.75 percent of "CoRezyn 10" gave the highest luminous efficiency (50,500 and 51,200 candle-seconds/gram for two samples tested). In this optimum formula, the ratio of oxidizer to fuel was 1:1, that is, 42 percent of sodium perchlorate and 42 percent of magnesium.

In order to evaluate ease of blending and casting, as well as luminous efficiency, alterations were made in the oxidizer to fuel ratio. When the amount of oxidizer was increased, the slurry was not as castable as the 1:1 formulation, and the luminous efficiency was less. Also upon lowering the percentage of oxidizer, the casting slurry became more fluid but again the luminous efficiency decreased.

The following examples are illustrative of the invention, wherein each of the percentages given is in terms of weight percent.

Example I

| | Percent |
|---|---|
| Glycidyl methacrylate | 7.75 |
| Ethylene dimethacrylate | 0.50 |
| Liquid basic polyester resin (CoRezyn 3) | 7.75 |
| Sodium perchlorate | 42.00 |
| Magnesium (granulated) | 42.00 |

A blend batch of 1500 grams was prepared with the liquid basic polyester resin being dissolved in the monomers, glycidyl methacrylate and ethylene dimethacrylate, with the latter monomer being added for cross-linking purposes. To this binder syrup, about 1.2 grams of benzoyl peroxide was added as a catalyst and stirred until completely dissolved. Approximately 30 ml. of this binder was then put aside for further use. Sodium peroxide was then added to the remaining binder syrup and blended using a planetary mixer until a homogeneous blend was added. Next the granulated magnesium was added and blending was continued. Ten drops of N,N-dimethyl-p-toluidine, a room-temperature curing agent, was added to the 30 ml. of binder syrup which was previously set aside, and stirred in completely and immediately added to the slurry. The slurry was again blended for about 5 minutes and cast into flare molds. A mild polymerization exotherm was noticed in about 20 minutes after casting. The cast flares were allowed to polymerize at room temperature and were given a post cure at 150 degrees F. in order to insure complete polymerization.

The cast candle was burned and a radiometer system was used to detect flare intensity. The testing and measuring was performed in the open air at ambient conditions. Test results indicated that the cast candle had a luminous efficiency of 47,000 candle-seconds per gram.

Example II

| | Percent |
|---|---|
| Glycidyl methacrylate | 7.75 |
| Ethylene dimethacrylate | 0.50 |
| Liquid basic polyester resin (CoRezyn 10) | 7.75 |
| Sodium perchlorate | 42.00 |
| Magnesium (granulated) | 42.00 |

The ingredients were blended and cast as in Example I. The only difference between the formulation of this example and the formulation of Example I is the "CoRezyn." "CoRezyn 10" has a viscosity of between 600–650 cps., while CoRezyn 3 has a viscosity of over 100,000 cps.

The candle of this Example II was burned and tested as in Example I. Test results indicated that the cast candle had a luminous efficiency of 50,500 candle-seconds per gram.

Example III

| | Percent |
|---|---|
| Glycidyl methacrylate | 7.75 |
| Ethylene dimethacrylate | 0.50 |
| Liquid basic polyester resin (CoRezyn 10) | 7.75 |
| Sodium perchlorate | 40.00 |
| Magnesium (granulated) | 44.00 |

The ingredients were blended and cast as in Example I. Upon burning, the candle had a luminous efficiency of 49,800 candle-seconds per gram.

Example IV

| | Percent |
|---|---|
| Glycidyl methacrylate | 7.75 |
| Ethylene dimethacrylate | 0.50 |
| Liquid basic polyester resin (CoRezyn 10) | 7.75 |
| Sodium perchlorate | 36.00 |
| Magnesium (granulated) | 48.00 |

The ingredients were blended and cast as in Example I. Upon burning, the candle had a luminous efficiency of 44,300 candle-seconds per gram.

Example V

| | Percent |
|---|---|
| Glycidyl methacrylate | 7.75 |
| Ethylene dimethacrylate | 0.50 |
| Liquid basic polyester resin (CoRezyn 10) | 7.75 |
| Sodium perchlorate | 44.00 |
| Magnesium (granulated) | 40.00 |

The ingredients were blended and cast as in Example I. Upon burning, the candle had a luminous efficiency of 43,700 candle-seconds per gram.

Example VI

| | Percent |
|---|---|
| Glycidyl methacrylate | 6.20 |
| Ethylene dimethacrylate | 0.50 |
| Liquid basic polyester resin (CoRezyn 10) | 6.20 |
| Sodium perchlorate | 41.40 |
| Magnesium (granulated) | 45.70 |

The ingredients were blended and cast as in Example I. Upon burning, the candle had a luminous efficiency of 46,800 candle-seconds per gram.

From the foregoing examples, it can be seen that castable visual flare formulations producing very high luminous efficiencies have been developed while using relatively high binder percentages. Optimum results were obtained when the oxidizer to fuel ratio was maintained close to 1:1. Obviously many modifications and variations of the present invention are possible in the light of the above teachings.

We claim:

1. A castable illuminating composition comprising, by weight,
   between 40 and 48 percent of magnesium,
   between 40 and 44 percent of sodium perchlorate, and
   the balance of a binder comprising by weight, between 48 and 72 percent of glycidyl methacrylate, between 2 and 4 percent of ethylene dimethacrylate, and between 25 and 50 percent of a monomer free unsaturated polyester resin.

2. A castable illuminating composition as set forth in claim 1 wherein the ratio of magnesium to sodium perchlorate is approximately 1 to 1.

3. A castable illuminating composition as set forth in claim 1 wherein said binder is 16 percent of the total weight of the composition and the ratio of magnesium to sodium perchlorate is approximately 1 to 1.

References Cited

UNITED STATES PATENTS

| 1,320,514 | 11/1919 | Waldo | 149—42 X |
| 2,968,542 | 1/1961 | Brock | 149—42 X |
| 3,257,801 | 6/1966 | Martinez et al. | 149—42 X |
| 3,258,373 | 6/1966 | Douda | 149—42 X |

BENJAMIN R. PADGETT, Primary Examiner

S. J. LECHERT, Assistant Examiner

U.S. Cl. X.R.

149—42, 44, 85